Patented Nov. 17, 1942

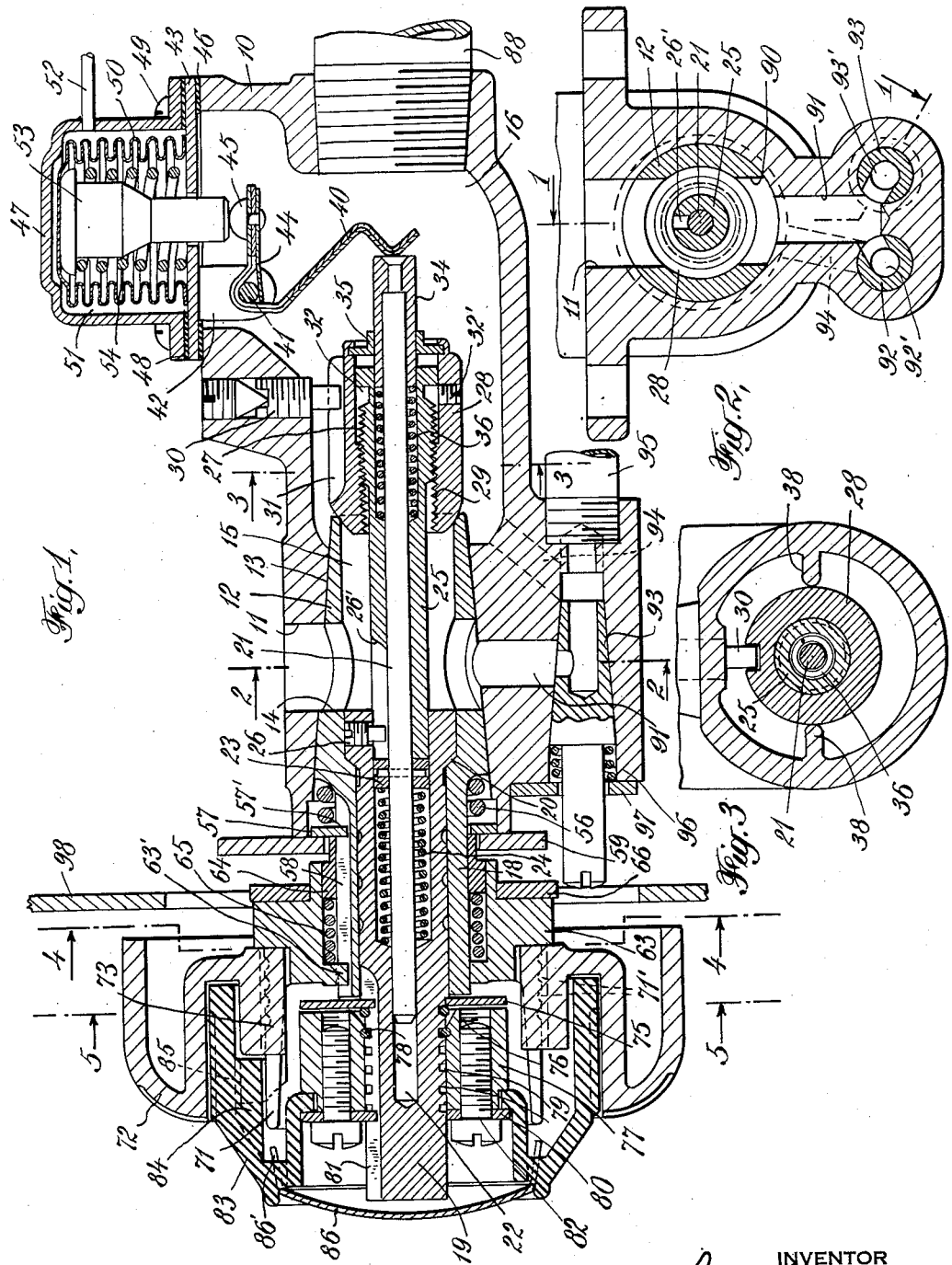

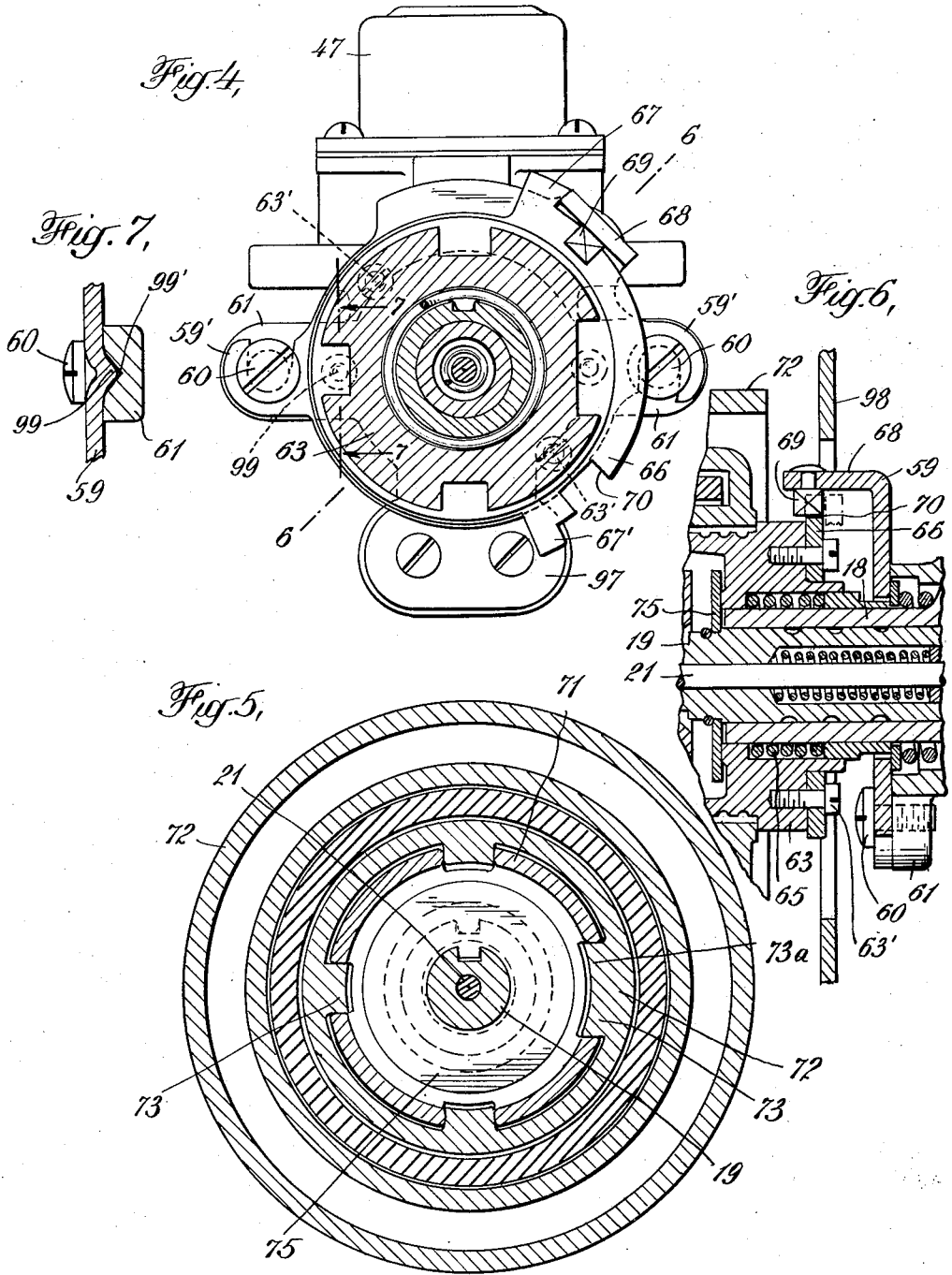

2,302,407

UNITED STATES PATENT OFFICE 2,302,407

TEMPERATURE REGULATOR

Benson F. Waddell, Newark, N. J., assignor to The Wilcolator Company, Newark, N. J., a corporation of Delaware Application October 11, 1939, Serial No. 298,953

13 Claims. (Cl. 236—99)

This invention relates to temperature regulators of the type which includes both a thermo-responsive valve for controlling the rate of flow of fuel to a burner, and a manually actuated valve by which the flow may be turned on or cut off at will. More particularly, the invention is concerned with a novel regulator of this type in which the thermo-responsive valve is supported on and adjustable by a manually operated temperature adjustment means extending through the cut-off valve. The new regulator may be manufactured at low cost, is reliable in operation, and may be easily assembled and taken apart.

One feature of the invention resides in the provision of a novel temperature regulator in which the cut-off valve, the thermo-responsive valve and the manual actuating means for the valves may be removed from the regulator as a unit by a simple operation. A regulator made in accordance with the invention comprises a hollow cut-off valve rotatable in a casing to move a lateral opening in the valve into and out of alignment with a fuel port in the casing. A longitudinal passage in the cut-off valve extends from the lateral opening to the inner end of the valve which opens into a main chamber in the casing, and flow through this passage is controlled by a thermo-responsive valve which may be arranged in the chamber to seat against the open end of the cut-off valve. The regulating valve is supported in the chamber by a manual adjustment means rotatable in the cut-off valve and preferably having a threaded connection with the regulating valve so that when the adjustment means is rotated, the regulating valve is moved to different settings. Automatic movement of the regulating valve is effected by a thermo-responsive element in the chamber which preferably actuates the support for the regulating valve through a spring, or the like for accommodating movement of the thermo-responsive element after the regulating valve is seated, due to overshoot of the regulated temperature. Outside the casing, the cut-off valve and the adjusting means for the regulating valve may be provided with independent operating devices, and the valves, the operating devices and the adjusting means are removable from the casing as a unit by releasing a connection which normally holds the parts in their operative positions.

Another feature of the invention resides in a novel arrangement of the thermo-responsive means for actuating the regulating valve. In the preferred construction, the thermostat includes an expansible and contractible chamber connected through a capillary tube to a bulb adapted to be mounted in the appliance to be controlled, the bulb, tube and chamber being filled with a thermo-responsive liquid. The thermostat is mounted on a side wall of the casing so that the end wall may be formed with a port communicating with the main chamber in the casing. A pin engaging a wall of the expansible and contractible chamber extends through the casing into the main chamber at right angles to the direction of movement of the regulating valve, and one end of the pin engages an arm on a bi-metallic bell-crank lever pivoted in the casing. The other arm of the lever engages an adjustable, sliding connection to the regulating valve, and the lever is thus operable to transmit movement of the thermostat to the regulating valve and also to compensate for ambient temperature changes.

Still another feature of the invention resides in the provision of a novel actuating means for the cut-off valve and the temperature-adjusting means of the regulating valve, the actuating means including a pair of independently rotatable handles carried by the cut-off valve. The temperature-adjustment handle is preferably arranged co-axially with the handle for the cut-off valve and in front of and partly within the latter handle, and the two handles are so mounted that they may be adjusted to different axial positions to facilitate installation of the regulator. Also, the handle construction permits of easy calibration of the regulator by a simple operation.

These and other features of the invention may be better understood by reference to the accompanying drawings illustrating one form of the regulator suitable for controlling the temperature of a gas oven. In the drawings Fig. 1 is a longitudinal sectional view of the new regulator, with the cut-off valve in its "on" position;

Figs. 2, 3, 4, and 5 are sectional views on the lines 2—2, 3—3, 4—4, and 5—5, respectively, in Fig. 1;

Fig. 6 is a partial section on the line 6—6 in Fig. 4, with the cut-off valve in its "off" position, and Fig. 7 is a sectional view on the line 7—7 in Fig. 4, with part of the regulator broken away.

The regulator, as illustrated, comprises a casing 10 having an inlet port 11 which may be connected to the manifold of a gas range. The passage of gas through the port 11 is controlled by a rotatable cut-off valve 12 fitted closely in a seat 13 in the casing. When the cut-off valve is in its "on" position a lateral opening 14 therein is aligned with the inlet port 11 so that gas may flow into a longitudinal passage 15 in the cut-off valve, the inner end of which opens into a main chamber 16 in the casing.

An extension 18 of the cut-off valve projects through the front end of the casing and is formed with a cylindrical bore to receive a rotatable adjustment shaft 19 located axially in the valve by a shoulder 20 on the shaft engaging an internal shoulder in the valve. Slidably mounted in the shaft 19 is a rod 21 supported at its front end in a small bore 22 in the shaft and intermediate its ends by an abutment ring 23 which fits closely in an enlargement of the bore 22 and is pinned to the rod. A compression spring 24 coiled around the rod 21 is seated at its outer end against a shoulder in the shaft 19 and at its inner end against the ring 23, so that the spring urges the rod inwardly. Mounted on the rod 21 partly within the shaft 19 is an adjustment member 25 which is movable axially on the shaft and in which the rod is slidable. The member 25 rotates with the shaft through a drive screw 26 on the shaft engaged in a longitudinal slot 26' in the member.

Near its inner end, the member 25 has an enlarged threaded portion 27 disposed in an axial bore in a nut or regulating valve 28. The outer portion of the bore is threaded, as shown at 29, and the regulating valve is screwed on the adjustment member 25 but held against rotation by a pin 30 screwed into a wall of the casing and projecting into a longitudinal groove 31 in the regulating valve. At its inner end the adjustment member fits tightly in the bore, and the member defines with the wall of the bore an annular recess 32 for receiving grease through a lateral opening which is normally closed by a threaded plug 32'. The grease lubricates the threaded connection between the adjustment member and the regulating valve and renders the connection gas tight. The rod 21 projects through the regulating valve 28 and carries at its inner end a sleeve 34 on which a bushing 35 is slidably mounted, the rear end of the valve 28 being bent over the bushing. A compression spring 36 somewhat weaker than the spring 24 is coiled around the rod 21 within the adjustment member 25, and the inner end of the spring is seated against the sleeve 34 and the other end against a shoulder in the member 25 whereby the spring is operable to urge the member 25 outwardly against the ring 23. The casing may be provided with a pair of opposed ribs 38 spaced slightly from the sides of the regulating valve to limit lateral movement thereof due to manipulation of the adjusting means.

The regulating valve is movable by a thermo-responsive element in the form of a bi-metallic bell-crank lever 40 mounted in the chamber 16 on a pivot pin 41 secured to a bracket 42 on a guide plate 43, the lever being held on the pivot pin by a retainer 44 secured to one arm of the lever by a rivet 45. The plate 43 is mounted on a side wall of the casing over a lateral opening, and an annular washer 46 is preferably interposed between the plate and the casing. A cup-shaped member 47 is seated at its open end on an annular washer 48 on the plate 43, and the cupped member, the washers and the guide plate are secured to the casing by bolts 49. Within the member 47 is a metallic bellows 50 sealed at its open end to the guide plate around a central opening therein, the bellows and the cupped member forming an expansible and contractible chamber 51. The chamber 51 communicates through a capillary tube 52 with a bulb (not shown) adapted to be mounted in the oven and the bulb, tube and chamber are filled with a thermo-responsive liquid such as chlorinated diphenyl. A headed pin 53 seated against the end of the bellows projects through the opening in the guide plate into contact with the rivet 45 and tends to contract the chamber 51 under the action of a spring 54 coiled around the pin and bearing at one end against the head of the pin and at the opposite end against the guide plate.

The cut-off valve 12, as shown, is generally conical and is mounted in the casing with its tapered end in the chamber 16 so that it is removable from the casing. However, it is normally held against the conical seat 13 by a compression spring 56 coiled around the extension 18 and bearing at one end against a shoulder on the cut-off valve and at the opposite end against a washer 57 having a key 57' fitted in a keyway 58 in the cut-off valve. The washer 57 is engaged by a retaining member 59 formed with diametrically opposed hooked portions 59' disposed under the heads of screws 60 threaded in studs 61 on the casing.

A hub 63 is slidably mounted on the extension 18 of the cut-off valve and is supported at its rear end by a thrust sleeve 64 on the extension, the sleeve projecting through the retaining member 59 and engaging the washer 57. A spring 65 is coiled around the extension 18 within the hub and bears at its outer end against a shoulder in the hub and at its inner end against the thrust sleeve 64. The hub is removable off the end of the extension 18 but is keyed thereto by a key 63' engaged in the keyway 58. Secured to the rear face of the hub 63, as by means of screws 63', is a lock plate 66 having a pair of peripheral projections 67 and 67' adapted to engage a finger 68 on the retaining member 59 and thereby limit rotation of the hub and the cut-off valve. The finger 68 carries a square pin 69 adapted to fit in a notch 70 in the periphery of the lock plate 66 adjacent the projection 67'.

The hub 63 is provided with an outwardly extending sleeve 71 supporting a handle 72 formed with lugs 73 extending into longitudinal slots in the sleeve. One of the lugs 73a is somewhat wider than the others and extends into an enlarged slot in the sleeve 71 so that the handle may be mounted in only one angular position relative to the hub. The handle, as shown, abuts against a shoulder on the hub, but it may be located in any of several different axial positions on the hub sleeve by a snap ring (not shown) adapted to fit in circumferential grooves 71' in the sleeve.

A thrust washer 75 is keyed on the shaft 19 in front of the hub and is held against a shoulder on the shaft by a retaining ring 76 fitted in a circumferential groove in the shaft. In front of the washer 75 is a dial collar 77 located axially on the shaft by a snap ring 78 which is engaged partly in a circumferential recess in the bore of the collar and partly in one of a series of circumferential grooves 79 in the shaft. The dial collar is keyed to the shaft by a washer 80 having a key disposed in a keyway 81 in the shaft, the collar being secured to the washer by screws 82 which also serve to clamp an annular portion of a dial 83, or other suitable temperature-adjustment handle, between the collar and washer. The dial is formed with a lug 84 adapted to engage a projection 85 on the handle 72, whereby rotation of the dial is limited by the handle. A disc 86 removably held on the front face of the dial 83 by tines 86' serves to conceal the end of the adjustment shaft 19 and the screws 82.

When the regulator is not in use, the handle 72 for the cut-off valve is in its "off" position wherein the cut-off valve is turned substantially 90 deg. from the position shown in Fig. 1 so that the opening 14 is out of alignment with inlet port 11. In this position of the handle, the projection 67' on the lock plate engages finger 68 on the retaining member, and the pin 69 on the finger is in line with notch 70 in the plate, as shown in Fig. 6. Thus, the spring 65 holds the hub 63 in its outer position against thrust washer 75 so that the finger 69 is engaged in notch 70 and prevents rotation of the cut-off valve and its handle. In starting the oven, the handle 72 is first pushed inwardly to force hub 63 to its inner position against the action of spring 65, as indicated in dotted lines in Fig. 6, thereby disengaging the notch 70 from pin 69. Then, the handle 72 is turned clockwise until projection 67 on the lock plate engages the finger 68. During this rotation, the hub 63 is held in its inner position by engagement of pin 69 with the outer face of plate 66, and opening 14 in the cut-off valve is moved into alignment with inlet port 11, as shown in Fig. 1. The dial 83 is then turned so as to rotate the shaft 19 and adjustment member 25 and thereby move the regulating valve 28 away from its seat on the cut-off valve, the final setting of the valve 28 being determined by temperature graduations (not shown) which may be marked on the face of the dial 83 so as to register with a suitable index on the handle 72. Gas may now flow through the port 11, the opening 14 and passage 15 into the main chamber, from where it may pass through an outlet 88 in the rear end of the casing to the oven burner.

As the oven temperature rises, the liquid in the thermostatic system expands and moves the pin 53 inwardly so as to turn the lever 40 clockwise on the pivot 41. This movement of the lever urges the sleeve 34 and the rod 21 to the left, as seen in Fig. 1, thereby moving the ring 23 to the left and compressing spring 24. Since the spring 36 urges the adjustment member 25 against the ring 23, this movement of the parts causes the regulating valve 28 to move toward the cut-off valve and throttle the flow of gas to the oven burner. In the event that over-shoot of the oven temperature causes the regulating valve to seat on the cut-off valve, further clockwise movement of the lever 40 is accommodated by the spring 36. That is, further movement of rod 21 to the left after the regulating valve is seated, causes the rod 21 to slide through the adjustment member 25 against the action of both of the springs 24 and 36, and thus disengage ring 23 from the adjustment member 25. Thereafter, when the oven cools, the lever 40 moves in a counter-clockwise direction and allows the spring 24 to move the rod 21 to the right (Fig. 1) until the ring 23 re-engages the end of the adjustment member, the regulating valve being held seated by spring 36 during this return movement.

In adjusting the regulator from a high temperature setting to a lower one, the dial 83 is turned in the opposite direction so that the threaded member 25 moves the regulating valve toward its seat, if it is not already seated. When the regulating valve is seated, further rotation of the member 25 in the same direction causes the member to move inwardly or to the right so as to disengage the ring 23 and compress spring 36, the latter holding the valve seated during this movement. Thus, before the regulating valve can be opened thermostatically, the oven must cool sufficiently to allow the spring 24 to move ring 23 back into engagement with the adjustment member 25.

If desired, the cut-off valve may be provided with a second lateral opening 90 diametrically opposite the opening 14 to supply gas for a bypass and a pilot. When the cut-off valve is in its "on" position, the opening 90 is in alignment with a passage 91 in the casing which leads to a pair of longitudinal bores in which plug valves 92 and 93 are rotatably mounted. The plug valves, as shown are hollow and are provided with lateral openings adapted to align with the passage 91. The valve 92 has a longitudinal passage 92' leading from the lateral opening through the end of the valve and communicating with a passage 94 leading to the main chamber 16. The other valve 93 is provided with a similar longitudinal passage 93' which leads through the inner end of the valve and communicates with a pipe 95 threaded in the casing and supplying a pilot for the oven burner. Each of the plug valves 92 and 93 is held against its seat in the casing by a spring 96 coiled around an extension of the valve and engaged at one end with a shoulder on the valve and at the other end with a plate 97 secured to the casing. The valves 92 and 93 may be rotated to adjust the flow of gas through the bypass 94 and the pilot supply pipe 95.

In the new regulator, the cut-off valve, the regulating valve and its adjustment means, and the operating handles may be removed from the casing by simply loosening the screws 60, turning the retaining plate 59 in a counter-clockwise direction so as to disengage the hooked portions 59' from the screws 60, and then withdrawing the parts as a unit from the casing. This is a desirable feature because it allows the regulator to be taken apart quickly and easily for cleaning or repairing purposes. Also, since these parts are in a unitary sub-assembly, the regulator may be more easily assembled in the factory or on the appliance with which the regulator is used. The sub-assembly is applied to the regulator by simply inserting the cut-off valve in the casing to engage rod 21 with lever 40 and turning the retaining member 59 clockwise to move the hooks 59' under the heads of screws 60 which are then tightened to hold the sub-assembly in position.

In installing oven regulators of this general type, the handles are usually mounted in front of a panel 98 on the range, but since the position of the panel relative to the manifold to which the regulator is connected may not be the same in all ranges, difficulty is sometimes experienced in arranging the handles in the proper axial position with respect to the panel. In the new regulator this difficulty is overcome by the novel handle construction which permits ready adjustment of the handles in an axial direction. That is, the handle 72 may be located in any one of several different axial positions by moving it along the sleeve 71 and inserting a snap ring in one of the grooves 71' so that the rear end of the handle bears against the ring.

Similarly, the dial 83 may be adjusted axially by removing the dial collar 76 and inserting the snap ring 78 in a different groove 79. Calibration of the regulator may be easily effected by removing the disc 86, loosening the screws 82, and turning the dial 83 relative to the dial collar. When the calibrating operation is completed, the screws are tightened to hold the dial frictionally on the collar, and the disc 86 is then replaced. By arranging the dial partly within the handle for the cut-off valve, as shown, the handle construction is made compact, easy to manipulate and pleasing in appearance. If desired, a stop may be provided to prevent rotation of the dial below the lowest oven temperature setting, say 200 deg., so that in moving the dial to the usual cold check position, it must be drawn outwardly to avoid the stop.

Since the bellows assembly of the thermostat is on the side wall of the casing, the end wall of the casing may receive the outlet pipe for supplying the oven burner. Thus, the pipe connection to the burner is more direct and more easily installed than in prior regulators of this type wherein the bellows is mounted on the end wall of the casing so that the outlet pipe must extend from the side wall. The lever 40 acts to translate longitudinal movement of the pin 53 into a movement at right angles thereto for actuating the regulating valve, and also flexes in response to ambient temperature changes so as to compensate for the effect of such changes on the thermo-responsive liquid in chamber 51. Since the lever is supported by the guide plate 43, the main thermostat and the compensating thermostat may be installed quickly and easily as a unit. Such installations may be made either before or after the valve assembly is installed. It will be observed that the lever 40 actuates the regulating valve through a sliding connection provided by the sleeve 34, spring 36 and adjustment member 25, and this connection is adjustable by rotation of member 25.

If desired, the retaining plate 59 may be provided with detents 99 engaged in recesses 99' in the studs 61. These detents serve to locate the plate 59 and the removable subassembly in the proper angular position and to prevent accidental turning of these parts when the screws 60 are not fully tightened.

I claim:

1. In a temperature regulator, a casing having a valve seat and a port opening into the seat, a hollow cut-off valve in the casing coacting with the seat, the cut-off valve being removable from the casing, manually operable adjusting means extending through and supported by the cut-off valve, the adjusting means being mounted in the cut-off valve for rotation therewith but also being rotatable relative to the cut-off valve, said valve and the adjusting means together defining a fuel passage extending partly along the adjusting means for connecting said port with the interior of the casing, a regulating valve in the casing for controlling the rate of flow through the cut-off valve and mounted on a part of the adjusting means, a thermo-responsive element in the housing for controlling the regulating valve, means whereby rotation of the adjusting means moves the regulating valve to different temperature settings, the regulating valve and the adjusting means being removable from the casing with the cut-off valve as a unit, and releasable means for securing the cut-off valve to the casing.

2. In a temperature regulator, a casing having a valve seat and a port opening into the seat, a hollow cut-off valve in the casing coacting with the seat, the cut-off valve being removable from the casing, manually operable adjusting means extending through and supported by the cut-off valve, the adjusting means being mounted in the cut-off valve for rotation therewith but also being rotatable relative to the cut-off valve, said valve and the adjusting means together defining a fuel passage extending partly along the adjusting means for connecting said port with the interior of the casing, a regulating valve in the casing for controlling the rate of flow through the cut-off valve and mounted on a part of the adjusting means, a thermo-responsive element in the housing for controlling the regulating valve, means whereby rotation of the adjusting means moves the regulating valve to different temperature settings, the regulating valve and the adjusting means being removable from the casing with the cut-off valve as a unit, releasable means on the casing for securing the cut-off valve against removal therefrom, and means coacting with said locking means for releasably securing the cut-off valve against rotation from its off position.

3. In a temperature regulator, a casing having a valve seat and a port opening into the seat, a hollow cut-off valve in the casing coacting with the seat, the cut-off valve being removable from the casing, manually operable adjusting means extending through and supported by the cut-off valve, the adjusting means being mounted in the cut-off valve for rotation therewith but also being rotatable relative to the cut-off valve, said valve and the adjusting means together defining a fuel passage extending partly along the adjusting means for connecting said port with the interior of the casing, a regulating valve in the casing for controlling the rate of flow through the cut-off valve and mounted on a part of the adjusting means, a thermo-responsive element in the housing for controlling the regulating valve, means whereby rotation of the adjusting means moves the regulating valve to different temperature settings, the regulating valve and the adjusting means being removable from the casing with the cut-off valve as a unit, releasable means on the casing for securing the cut-off valve against removal therefrom, and means coacting with said locking means for limiting the rotation of the cut-off valve.

4. In a temperature regulator, a casing having a port in a wall thereof, a cut-off valve rotatable in the casing to control flow through the port, a temperature adjustment shaft rotatable in the cut-off valve, a rod mounted in the shaft and slidable axially therein, an adjustment member on the rod movable axially of the shaft and rotatable thereby, said member defining with the cut-off valve a longitudinal passage between said port and the interior of the casing, an abutment on the rod with which the outer end of said member is engageable, the rod being slidable axially in said member to disengage the abutment therefrom, a regulating valve threaded on the adjustment member and coacting with the inner end of the cut-off valve to control the rate of flow therethrough, means for securing the regulating valve against rotation whereby rotation of the adjustment member by the shaft moves the regulating valve to different settings, said rod projecting through the inner end of the cut-off valve and through the regulating valve, a thermo-responsive element in the casing engaging the inner end of the rod and operable to move the rod outwardly, a spring for urging the adjustment member against said abutment whereby outward movement of the rod by said element causes the adjustment member and the regulating valve to move outwardly and throttle the flow through the cut-off valve, and a spring urging the rod against said element and operable to move the adjustment member and the regulating valve inwardly.

5. In a temperature regulator, a casing having a port in a wall thereof, a cut-off valve rotatable in the casing to control flow through the port, a temperature adjustment shaft rotatable in the cut-off valve, a rod mounted in the shaft and slidable axially therein, an adjustment member on the rod movable axially of the shaft and rotatable thereby, said member defining with the cut-off valve a longitudinal passage between said port and the interior of the casing, an abutment on the rod with which the outer end of said member is engageable, the rod being slidable axially in said member to disengage the abutment therefrom, a regulating valve threaded on the adjustment member and coacting with the inner end of the cut-off valve to control the rate of flow therethrough, said abutment and the outer end of said member being fitted closely in the shaft to support the regulating valve, means for securing the regulating valve against rotation whereby rotation of the adjustment member by the shaft moves the regulating valve to different settings, said rod projecting through the inner end of the cut-off valve and through the regulating valve, a thermo-responsive element in the casing engaging the inner end of the rod and operable to move the rod outwardly, a spring for urging the adjustment member against said abutment whereby outward movement of the rod by said element causes the adjustment member and the regulating valve to move outwardly and throttle the flow through the cut-off valve, and a spring urging the rod against said element and operable to move the adjustment member and the regulating valve inwardly.

6. In a temperature regulator, a casing having a valve seat and a port opening into the seat, a cut-off valve supported in the casing adjacent the seat and movable selectively to turn on and shut off the flow of fluid through said port, adjustment means supported in the cut-off valve and movable relative thereto, a temperature regulating valve coacting with the cut-off valve as a seat and mounted on part of the adjusting means supported in the cut-off valve, a thermo-responsive element for operating the regulating valve to control the rate of flow through said port when the cut-off valve is turned on, means whereby movement of the adjustment means adjusts the regulating valve to different settings relative to its seat on the cut-off valve, the adjustment means and regulating valve being removable with the cut-off valve as a unit from the casing, and releasable means for securing the cut-off valve in the casing.

7. In a temperature regulator, a casing, a cut-off valve supported in the casing and movable selectively to turn on and shut off the flow of fluid through the casing, adjustment means supported in the cut-off valve and movable relative thereto, a temperature regulating valve mounted on part of the adjustment means supported in the cut-off valve and operable to control the rate of flow through the casing when the cut-off valve is turned on, means whereby movement of the adjustment means adjusts the regulating valve to different temperature settings, the adjustment means and regulating valve being removable with the cut-off valve as a unit from the casing, and releasable means for securing the cut-off valve in the casing.

8. In a temperature regulator, a casing, a cut-off valve supported in the casing and movable selectively to turn on and shut off the flow of fluid through the casing, adjustment means supported in the cut-off valve and movable relative thereto, a temperature regulating valve mounted on part of the adjustment means supported in the cut-off valve, a thermo-responsive element engaging the inner end of the adjusting means and operable through part of the adjusting means supported in the cut-off valve to actuate the regulating valve and thereby control the rate of flow through the casing when the cut-off valve is turned on, means whereby movement of the adjustment means adjusts the regulating valve to different temperature settings, the adjustment means and regulating valve being removable with the cut-off valve as a unit from the casing, and releasable means for securing the cut-off valve in the casing.

9. In a temperature regulator, a casing, a cut-off valve supported in the casing and movable selectively to turn on and shut off the flow of fluid through the casing, adjustment means supported in the cut-off valve and rotatable relative thereto, a temperature regulating valve threaded on part of the adjustment means supported in the cut-off valve and operable to control the rate of flow through the casing when the cut-off valve is turned on, means for securing the regulating valve against rotation whereby rotation of the adjustment means moves the regulating valve to different temperature settings, the adjustment means and regulating valve being removable with the cut-off valve as a unit from the casing, and releasable means for securing the cut-off valve in the casing.

10. In a temperature regulator, a casing, a cut-off valve supported in the casing and movable selectively to turn on and shut off the flow of fluid through the casing, adjustment means supported in the cut-off valve and movable relative thereto, a temperature regulating valve mounted on part of the adjustment means supported in the cut-off valve, a thermo-responsive element for moving the adjustment means axially in one direction in the cut-off valve to actuate the regulating valve and thereby control the rate of flow through the casing when the cut-off valve is turned on, means whereby movement of the adjustment means adjusts the regulating valve to different settings, means opposing axial movement of the adjustment means by said element and operable to move the adjustment means and regulating valve in the opposite direction, said adjustment means, regulating valve and opposing means being removable with the cut-off valve as a unit from the casing, and releasable means for securing the cut-off valve in the casing.

11. In a temperature regulator, a casing, a cut-off valve supported in the casing and movable selectively to turn on and shut off the flow of fluid through the casing, adjustment means supported in the cut-off valve and rotatable relative thereto, a temperature regulating valve threaded on part of the adjustment means supported in the cut-off valve and operable to control the rate of flow through the casing when the cut-off valve is turned on, means for securing the regulating valve against rotation whereby rotation of the adjustment means moves the regulating valve to different temperature settings, a thermo-responsive element for moving the regulating valve automatically, a connection between said element and the regulating valve including a connecting member slidable in the adjustment means and projecting from the regulating valve into contact with said element and also including a spring seated at one end in the adjustment means and acting at its opposite end against the connecting member, the spring being compressible by the connecting member under the action of said element when the regulating valve is seated, said adjustment means, regulating valve and connection being removable with the cut-off valve as a unit from the casing, and releasable means for securing the cut-off valve in the casing.

12. In a temperature regulator, a casing, a cut-off valve supported in the casing and movable selectively to turn on and shut off the flow of fluid through the casing, adjustment means supported in the cut-off valve and movable relative thereto, a temperature regulating valve mounted on part of the adjustment means supported in the cut-off valve, a thermo-responsive element for actuating the regulating valve to control the rate of flow through the casing when the cut-off valve is turned on, means whereby operation of the adjustment means in the cut-off valve moves the regulating valve to different settings relative to said element, a handle outside the casing for operating the adjustment means, a sliding connection between the handle and the adjustment means for accommodating axial movement of the adjustment means relative to the handle by said element, a sliding connection between the adjustment means and said element including a yielding means through which movement of said element is transmitted to the regulating valve, said yielding means accommodating movement of said element after the regulating valve is seated, said adjustment means, regulating valve and sliding connections being removable with the cut-off valve as a unit from the casing, and releasable means for securing the cut-off valve is the casing.

13. In a temperature regulator, a casing, a cut-off valve supported in the casing and movable selectively to turn on and shut off the flow of fluid through the casing, adjustment means supported in the cut-off valve and movable relative thereto, a temperature regulating valve mounted on part of the adjustment means supported in the cut-off valve and operable to control the rate of flow through the casing when the cut-off valve is turned on, a thermo-responsive element projecting through one side of the casing generally transversely of the axis of the cut-off valve, a bi-metallic bell-crank lever pivotally mounted in the casing with one arm engaging said element, an adjustable connection between the other arm of the lever and the regulating valve, means whereby operation of the adjustment means in the cut-off valve adjusts said connection to move the regulating valve to different settings, said adjustment means, regulating valve and connection being removable with the cut-off valve as a unit from the casing, and releasable means for securing the cut-off valve in the casing.

BENSON F. WADDELL.